Nov. 1, 1949     R. R. FREUND     2,486,939

STUFFING BOX

Filed Aug. 2, 1944            2 Sheets-Sheet 1

INVENTOR.
Robert R. Freund
BY Danby & Danby
Att'ys.

Nov. 1, 1949 R. R. FREUND 2,486,939
STUFFING BOX
Filed Aug. 2, 1944 2 Sheets-Sheet 2

INVENTOR.
Robert R. Freund.
BY Darby & Darby
Att'ys.

Patented Nov. 1, 1949

2,486,939

UNITED STATES PATENT OFFICE 2,486,939

STUFFING BOX

Robert R. Freund, Phillips, Tex., assignor to Phillips Petroleum Company, a corporation of Delaware Application August 2, 1944, Serial No. 547,739

3 Claims. (Cl. 286—9)

This invention relates to improvements in stuffing boxes for pumps. More particularly, it relates to a method and means whereby any pump which is fitted with a shaft sleeve may be easily converted to include my improvement, the purpose of same being to improve the leakage and wear resisting characteristics of the stuffing box. My improvement has special utility where volatile fluids including hydrocarbons are to be handled by the pump.

In packing the shafts of rotary and reciprocating pumps, it was originally the practice to place the packing material directly in contact with the pump shaft. In the case of low speed pumps, particularly where other factors of use including temperature pressure, volatility of fluid pumped etc., are not severe, this method of packing is still used.

When the development of the pump art lead to use of high speed rotary types, it was necessary to take precaution against wearing of the shafts by frictional contact with the packing material. This factor became very troublesome in high pressure operation, since with higher pumping pressures it was necessary to pack shafts very tightly to prevent leakage and thus the severity of frictional wear increased.

Two improvements were evolved to alleviate the shaft wear situation. One consisted of providing a replaceable sleeve over the shaft proper and rotating with the shaft. Packing was applied then against the outside surface of the sleeve. This expedient did not serve in any way to reduce the wear factor. The increased resultant diameter of the packed surface produced an actual increase in surface speed with respect to the packing material and also required a heavier total loading of the packing in order to seal the larger surface. The increased total contact surface between the packing and the rotating element, however, tended to reduce the unit loading on the surface so that the effects of increased speed and total packing load were substantially self-compensating. The wear, however, was now imposed on a replaceable element of the pump shaft, so that a reduction in replacement costs was realized. The original cost of the equipment was increased, since the shaft sleeves must be very accurately machined to assure concentricity with the shaft proper, in the case of replacement sleeves as well as in original units.

The second general improvement referred to was in the matter of applying lubricant under pressure to the packed surface. This was accomplished by applying a hollow ring somewhere near the longitudinal midpoint of the packed surface and placing this ring or "lantern gland" in communication with a supply channel for introducing a lubricant to the ring. This served the dual purpose of reducing friction between the packing and shaft and to provide a better seal due to the viscous film of lubricant.

In cases where the pump body is built in two half-shells, with the juncture lying in a plane parallel with or including the axis of the shaft, difficulty is encountered in preventing leakage around the outside of the packing, along the line of juncture of the two halves of the pump case. It has been customary to rely upon the packing to deform and adapt itself to the contour of the stuffing box interior so as to seal off the longitudinal crevice between the two halves of the pump. While this effect is sometimes realized, the seal thus obtained is more often than not inadequate for high pressure service, with volatile hydrocarbons, for example.

Whenever hydrocarbons such as propane, butane and the like are to be handled by pumps, three extremely severe conditions are encountered which are conducive to packing gland failure. These are (1) high pressure, (2) solvent action, and (3) high permeability. High pressure operation is the rule because the products themselves have a high vapor pressure. In other words, the pressure at the inlet of the pump may be as high as 300 or more pounds per square inch, and will, of course, be raised further when pumping against any resistance to flow. The solvent action of volatile hydrocarbons upon lubricating oils is well known and has the effect of drying out pump packing material and rendering it stiff unless special provision is made for lubrication in a continuous manner. It is also known that the combination of the above characteristics, plus the low viscosity of the products in question, render the liquid capable of passing through seals, packing or even threaded joints which would satisfactorily hold other substances under the same pressure.

I have personally encountered the difficulties outlined above in connection with certain centrifugal pumps and have found my invention which is herein disclosed to be effective to a high degree in overcoming them. My invention may be practiced in a manner which will realize the following objects:

1. Reduction of shaft wear in the stuffing box to such a degree that it becomes of no consequence.
2. To effect the above reduction by providing positive lubrication of the shaft throughout the total packed length.

3. To enhance the above effect by eliminating the shaft sleeve and consequently reduce the linear speed of the packed surface relative to the packing itself.

4. To render the pump stuffing box impervious to leakage of volatile hydrocarbons as a result of the improved structure.

5. To provide conversion means by which the above objects may be attained in equipment already at hand without extensive alteration of the same.

Other objects and advantages will be discernible from a consideration of the following description.

This application is a continuation in part of my copending application Serial No. 430,311, filed February 10, 1942, for improvement in Stuffing boxes, now abandoned.

In the drawings.

Like numerals denote like parts in all the views.

Figure 1:
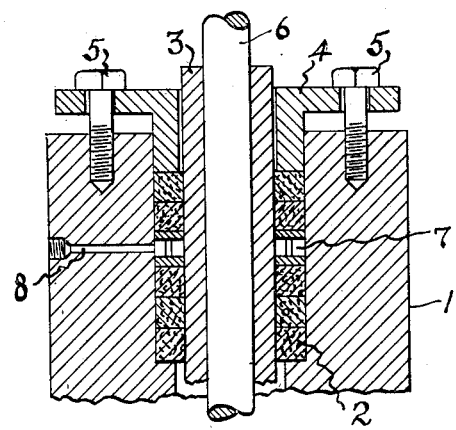
Figure 1 is a sectional view through a pump stuffing box, showing the conventional and well-known structure.

Referring to Figure 1, the numeral 1 refers generally to the stuffing box of a typical rotary pump of standard manufacture, in which the packing 2 is retained in contact with the shaft sleeve 3 by means of a gland 4 and studs 5. The shaft sleeve is threadedly engaged over the shaft 6, and both of these elements rotate as a single unit. A "lantern gland" or "lantern ring" 7 is often employed to distribute lubricant which may be introduced from outside by means of a channel 8, for example. Stuffing boxes and shaft sleeves of the sort illustrated here are old and well known to those familiar with the rotary pump art. One defect of such a structure is that lubricant for the stuffing box often leaks into and contaminates the material being pumped because the lubricant is frequently introduced at a higher pressure than that of the material being pumped.

Figure 2:
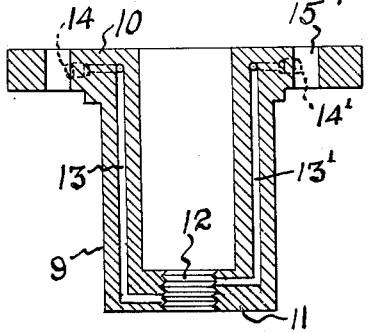
Figures 2 and 3 are longitudinal and transverse sections of my improvement, respectively.
Figure 3:
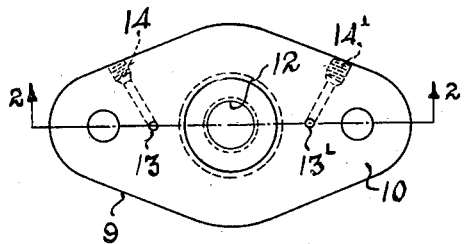
Figure 4:
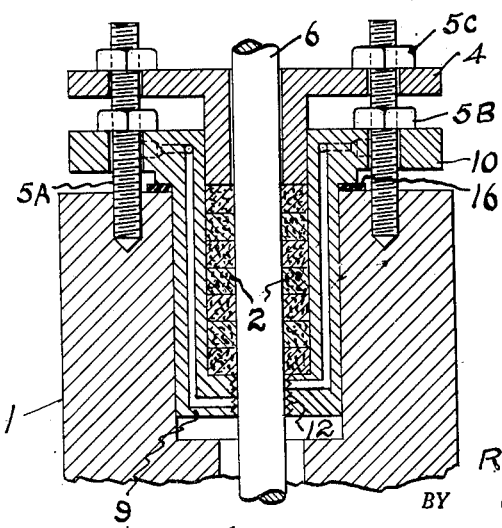
Figure 4 is a section through the same structure shown in Figure 1, but with certain elements removed and with my device installed in accordance with the teachings of this disclosure.

In Figures 2, 3, and 4, the numeral 9 indicates generally my improvement, hereinafter to be referred to as a "stuffing box insert," or simply "insert."

The body of my insert (Figures 2 and 3) is in the form of a one-piece cylindrical sleeve, having an external flange portion 10 at the outer end and an internally flanged portion 11 at the inner or pump end. The latter portion is machined to fit closely about the pump shaft but with sufficient clearance to permit free running. A series of shallow parallel grooves 12 are formed in the bore, which aid in retaining a film of lubricant at this point. A channel 13 is drilled in the wall of the insert and serves to transmit lubricant from an outside source to the grooves 12. The lubricant inlet connection 14 may be located at any point accessible from the outside. I prefer to locate this connection at the outer edge of the flange 10, but other locations may be more advantageous in some cases. In general, it should be arranged so as to utilize the most direct path for channel 13 that is possible and still make the connection 14 conveniently accessible. A similar channel 13' and inlet 14' is provided as shown. The flange bolt holes 15 are so spaced that the studs 5A may serve both for securing the insert to the stuffing box against a gasket 16, and for retaining the packing gland 4. Separate nuts 5B and 5C are provided for the insert and the gland, respectively.

It is to be particularly noted that channels 13 and 13' open into the grooves 12 at different levels. In accordance with this invention a suitable lubricant for the purpose is introduced through the inlet 14' and channel 13' into the uppermost of the grooves 12. It being remembered that this invention is illustrated for use with, but not necessarily limited to such use, a vertical pump so that the upper end of Figure 4, for example, is the power end and the lower end is the pump end. Referring to Figure 4, it will be seen then that the lubricant under suitable pressure is introduced into the upper portions of the grooves 12 through the channel 13'. A suitable fluid in the form of a gas or a liquid such as butane or other light hydrocarbon is introduced into the lower portion of the grooves 12 through inlet 14 by way of the passage 13. By properly balancing the pressures under which the lubricant and the light hydrocarbon respectively are introduced into the grooves 12, it will be seen that the light hydrocarbon will act as a seal or barrier against the passage of the lubricant down the shaft into the pump while leaving it free to move into the packing 2 and lubricate the entire face between it and the shaft 6. This result is obtained even though a slight clearance is allowed between the shaft 6 and the grooves 12, as is desirable to prevent metal to metal contact. The light hydrocarbon may on the other hand slowly leak through the lower portions of the threads 12 into the pump casing, where it is free to mix with the materials being pumped. In many cases it will be possible to select a light hydrocarbon which can go into the chemicals being pumped so as to either take part in any reaction to which they are subjected, or be present without interfering with that reaction. It will be understood that by the proper proportioning of the pressures of the lubricating oil and the light hydrocarbon, with due regard to their relative viscosities, they will leak at the desired rate into the packing and the pump housing respectively, while completely insulating the packing from the chemicals or the material being pumped. A slight upward leakage of light hydrocarbons into the packing and lubricant may be tolerated since it becomes admixed with lubricant before it enters the packing and small amounts will, therefore, not materially affect lubrication in this type of structure. It is to be understood that this type of structure described in connection with a vertical pump will, of course, have equal utility when used in horizontal pumps.

In applying my improvement, the shaft sleeve 3 (see Figure 1) is removed and discarded. Studs 5 are replaced by longer studs 5A. Having also removed the packing and gland, the insert 9 is now installed in the stuffing box cavity (see Figure 4). A suitable gasket 16 serves to seal against leakage between the outside of the insert and the interior of the stuffing box wall proper. The nuts 5B are drawn tight to maintain sealing engagement of the gasket. New packing rings 2 of appropriate size and composition are placed around the shaft within the insert. A new packing gland of appropriately reduced diameter is placed in position and secured by the nuts 5C. After connecting the inlets 14 and 14' to suitable sources of lubricant and gas or light hydrocarbon under pressure and having checked the new assembly for alignment with the shaft, the pump is then ready for operation.

In operation, the converted stuffing box now possesses the following desirable characteristics. First, and of primary importance, there is no longer a possibility of leakage around the outside of the packing along the line of juncture of the two halves of the pump case. The packing is now confined within a continuous, smooth cylinder having no longitudinal seams. The cylinder (insert) itself is sealed at the gasket 16 so that the resultant assembly is leakproof so far as surfaces other than that of the shaft itself are concerned.

Another source of leakage is also now eliminated, namely, the interface formerly presented between the shaft sleeve and the shaft itself.

The lubricant introduced at the region of the grooves 12 may serve at least four distinguishable purposes. First, a substantial portion of the lubricant will act to saturate the packing material and maintain it in a pliable state. Second, there is the lubrication or friction reducing function which acts at the interface between the shaft and the packing. A third function of the lubricant is to form a film of lubricant at the grooves, thus providing an effective dam of relatively more viscous material between the packing and the volatile contents of the pump. A fourth function of the lubricant is to provide a means for balancing the pressure of the light hydrocarbon whose pressure will, of course, be determined in part at least by the pressure within the pump itself by proportionately pressuring the lubricant, the light hydrocarbon and the internal pump pressure. These various fluids can be counterbalanced to form a very effective protecting barrier between the packing and the material being forced through the pump.

It may be seen from a study of Figure 4 that, with my improved packing arrangement, the packing itself may only be required to seal against escape of the lubricant, and the packing, therefore, is not subjected to the drying-out action of volatile hydrocarbons in the pump. The grooves may be a series of circumferential parallel grooves, a spiral thread or may be of any other suitable configuration providing a tortuous path for the lubricant. I have found by actual practice of my invention that an actual and very considerable improvement in the matter of increased packing life and reduced leakage through the stuffing box is realized thereby.

In the type of structure of Figure 4, it is possible under some conditions as, for example, on butane pumps, to eliminate the channel 13 employed for introducing a light hydrocarbon. Lubrication of the packing and shaft by the supply of lubricant through the channel 13' is insured and entry of lubricant into the butane is prevented by back pressure of the butane being pumped by slight leakage thereof through the threads 12, especially if the lubricant is supplied under a slightly lower pressure than the pressure of the material being pumped. Under this specialized condition the material being pumped, viz. butane, performs the function of the light hydrocarbon which would normally be introduced into the structure via channel 13. Thus when a light material like butane is being pumped under conditions which would permit this material to have the same function as the material intended to be introduced through channel 13, that channel may be omitted.

Figure 5:
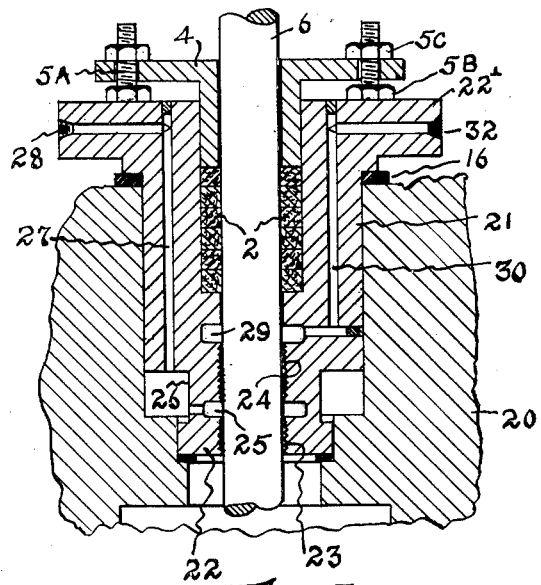
Figure 5 is a vertical, central, cross-sectional view through a pump stuffing box showing a modified form of the invention.

Other structural forms are illustrated in Figures 5 to 8 inclusive by means of which the principles of this invention may be applied. Figure 5 illustrates another form of stuffing box for a vertical pump, the portion 20 of the housing of which is illustrated in this figure. The insert 21 in this case is structurally different in some respects from that previously described. Towards the lower end 22 thereof there is provided a passage in which the shaft 6 lies which in turn is provided with a pair of vertically spaced grooves 25 and 29 of greater diameter than the shaft. In the body of the insert between these grooves are sets of helical threads 23 and 24, as shown, which are preferably made sharp at their apices and dimensioned so as to firmly contact the surface of the shaft without marring it. The lowermost end 22 is of less diameter than the main body of the insert and intermediate it and the main body is an annular surface groove 26 forming a chamber, as shown, with the pump housing 20. A passage 27 extends through the insert and opens into the chamber thus formed. This passage has the inlet connection 28 for the light hydrocarbon fluid either gaseous or liquid as conditions may require, such as those previously mentioned. The chamber into which the passage 27 extends is connected by a short passage in the insert with the annular space formed by the groove 25. Another passage 30, having the inlet 32, opens into a transverse passage which in turn opens into the annular space formed by the groove 29. The insert 21 is sealed in the pump housing on a gasket 16, as before, by means of threaded studs 5A threaded into the pump housing and passing through the flanged head 22' of the insert and firmly seated by means of the nuts 5B. In turn the packing gland 4, as before, engages the packing 2 under pressure by means of the nuts 5C. Thus the parts are all sealed together.

With this arrangement the lubricating oil is fed through inlet 32 and passage 30 to the annular space 29 and is free to pass into the packing 2 and to fill the threads 24. It is prevented from passing beyond the threads by means of the back pressure created by the light hydrocarbon fed through the inlet 28 and passage 27 to the annular space 25. This light hydrocarbon may leak in the opposite direction, that is downwardly so as to discharge at a controlled rate into the contents of the pump.

Figure 6:
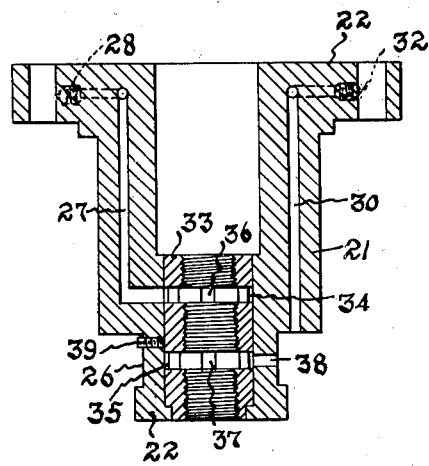
Figure 6 is a cross-sectional view taken on the line 6—6 of Figure 7, of a slightly modified form of insert as distinguished from the arrangement of Figure 5.
Figure 8:
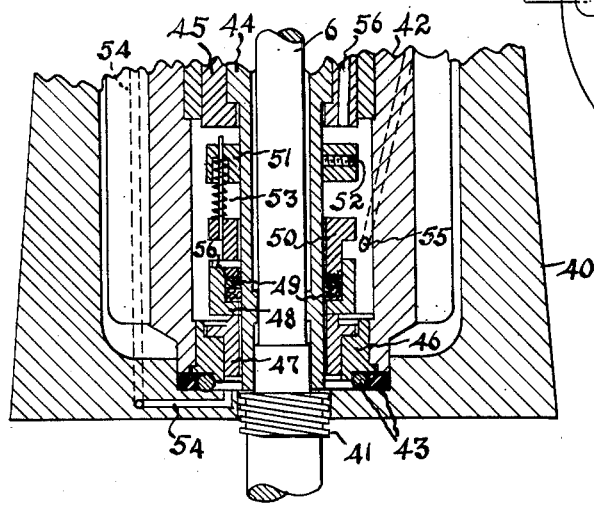
Figure 8 is a longitudinal, central, cross-sectional view through a further modified form of the invention.

The modification illustrated in Figure 6 is quite similar to that of Figure 5 and since the only difference is in the construction of the insert the complete assembly has not been shown. In this case, instead of forming the threads in the body of the insert they are formed in a removable bushing 33 which can be locked in the insert by means of the set screw 39. It will be understood with this construction that the bushing 33 can be replaced when it becomes worn. This bushing has three isolated sets of helical threads, as shown, separated by unthreaded portions which have a series of apertures 36 and 37 opening into annular grooves 34 and 35 respectively. Passage 30 communicates with the lower groove 35 through the passage 38, which will open into a chamber as before, formed by the pump housing and the annular surface groove 26 on the insert. The passage 27 opens into the annular groove 35. As before the lubricant will be fed through the passage 27 and the light hydrocarbon through the passage 30. With this arrangement the inner face between the light hydrocarbon and the lubricant can occur somewhere in the helical threads of the middle group. The lubricant can leak upwardly into the packing and the light hydrocarbon downwardly into the pump.

Figure 7:
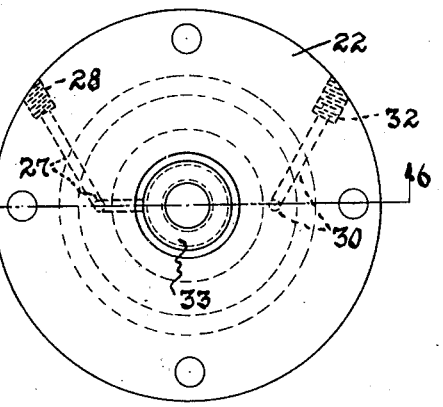
Figure 7 is a top plan view of the insert of Figure 6.

Figure 7 is included to show the cross-sectional shape and construction of the insert, and it may be stated that in general a top view of the insert 21 of Figure 5 will look like the illustration in Figure 7, the main difference being the absence of the bushing 33.

Finally there is illustrated another application of the subject matter of this invention to a well known form of stuffing box as employed, known as the "Duraseal." A portion 40 of the housing is shown through which the shaft 6 extends. The end of the shaft which will be exposed to the chemical being pumped, reacted or otherwise processed, is provided with helical threads 41 which form a snug fit in the opening in the adjacent part of the housing 40. Within the housing is mounted a sleeve, the lower end 42 of which only is shown, which is held in the housing by suitable attaching means, as is well known, against a pair of suitable gaskets 43, to form a seal, as shown. Surrounding and mounted upon the shaft 6 for rotation therewith, is a sleeve 44. This sleeve rotates in a steel bearing sleeve 45 suitably mounted in the main sleeve 42. Surrounding the sleeve 44 is a steel insert 47 preferably surface hardened or faced with a suitable material such as for example Stellite on its upper end, Figure 8. This insert is mounted in a steel mounting ring 46, in turn locked in the lower end of the main sleeve 42. Mounted on the sleeve 44 for rotation therewith is a rotary seal surface hardened or otherwise treated on the face engaging the adjacent face of the insert 47. The rotary seal 48 forms a chamber in which the packing 49 engaging the sleeve 44 is mounted. Bearing on this packing is the packing gland 50 which has a key 56 secured in it and engaging in a slot in the rotary seal 48 so as to permit relative movement between the gland 50 and the sleeve 42. This movement is sufficient to allow proper action of the springs 53. Mounted on the sleeve 44 is a collar 51 which is locked thereto by a set screw 52. Several springs 53, one of which is shown, are interposed between the collar 51 and the packing gland 50, each held in place by a pin as shown secured to the packing gland 50, and having a sliding connection with the collar 51. The springs 53 provide a resilient loading for the packing acting through the packing gland 50 which is slidably mounted on the sleeve 44. The loading on these springs can be adjusted by properly positioning the collar 51.

A passage 54 in the housing 40 opens in the space between the lower end of the sleeve assembly 42 and is in communication with the threads 41. This is the light hydrocarbon supply passage. Another passage opening at 55 to the space within the sleeve 42 provides the supply for lubricating oil to the packing material. The exit passage for this lubricant is shown at 56', and extends to the exterior of the structure.

It will be understood from the foregoing disclosure that the lubricant can reach the packing material 49 as well as lubricate other relatively rotating members, and the light hydrocarbon will prevent the passage of the lubricant downwardly by the back pressure created through its use. On the other hand, the light hydrocarbon can leak through the threads 41 into the body of material being processed on the lower side of the housing 40. As an example this stuffing box could be used on various chemical reactors at the bottom thereof, to drive, for example, an agitator mounted in the reactor. In this case the structure of Figure 8 would be rotated 180 degrees in the plane of the paper so that the end with the threads 40 would be the agitator end and the other end would be the power supply end. It will be seen that the general function of this structure is similar to that of the others. The illustration of Figure 8 merely serves as another illustration of the manner in which the principles of this invention may be applied.

While my invention has great utility in converting old pumps already in service, it is also within the scope of my invention to build new pumps according to the teachings disclosed, thereby effecting further economy. The scope of my invention is defined in the following claims.

What is claimed is:

1. A combination as disclosed comprising a wall on one side of which a pressure condition exists, a removable insert detachably mounted in a cavity of said wall, a rotary shaft extending through said insert and wall, a packing gland in said insert surrounding said shaft, said insert having grooves defining packing ribs surrounding said shaft and lying between said packing gland and the pressure side of said wall, the insert and shaft having a running fit at said ribs, and means for introducing sealing fluids at spaced longitudinal points adjacent said grooves.

2. In the combination of claim 1, said grooves being formed in longitudinally spaced groups and said last means supplying the fluids individually to said grooves.

3. In the combinaton of claim 1, a removable bushing in said insert in which said grooves are formed.

ROBERT R. FREUND.

REFERENCES CITED

The following references are of record in the file of this patent:

UNITED STATES PATENTS

| Number | Name | Date |
|---|---|---|
| 1,258,218 | Hicks | Mar. 5, 1918 |
| 1,505,647 | Junggren | Aug. 19, 1924 |
| 1,986,706 | Beyer | Jan. 1, 1935 |
| 2,133,524 | Boars | Oct. 18, 1938 |
| 2,220,965 | Kohler | Nov. 12, 1940 |
| 2,306,417 | Weissner | Dec. 29, 1942 |